United States Patent
Ameri-Yahia et al.

(10) Patent No.: US 9,116,983 B2
(45) Date of Patent: Aug. 25, 2015

(54) SOCIAL ANALYTICS

(75) Inventors: Sihem Ameri-Yahia, Doha (QA); Samuel Ross Madden, Cambridge, MA (US); Adam Marcus, Cambridge, MA (US)

(73) Assignee: QATAR FOUNDATION, Doha (QA)

( * ) Notice: Subject to any disclaimer, the term of this patent is extended or adjusted under 35 U.S.C. 154(b) by 519 days.

(21) Appl. No.: 13/434,418

(22) Filed: Mar. 29, 2012

(65) Prior Publication Data

US 2013/0212059 A1 Aug. 15, 2013

(30) Foreign Application Priority Data

Feb. 10, 2012 (GB) .................................. 1202309.9

(51) Int. Cl.
G06F 9/44 (2006.01)
G06F 17/30 (2006.01)
G06F 17/27 (2006.01)

(52) U.S. Cl.
CPC ...... G06F 17/30713 (2013.01); G06F 17/2785 (2013.01)

(58) Field of Classification Search
None
See application file for complete search history.

(56) References Cited

U.S. PATENT DOCUMENTS

| | | | |
|---|---|---|---|
| 8,838,633 B2* | 9/2014 | Dhillon et al. ................ | 707/758 |
| 2005/0114161 A1* | 5/2005 | Garg et al. ........................ | 705/1 |
| 2006/0069589 A1 | 3/2006 | Nigam et al. | |
| 2010/0153318 A1* | 6/2010 | Branavan et al. ................ | 706/12 |
| 2010/0262454 A1* | 10/2010 | Sommer et al. .................. | 705/10 |
| 2011/0137906 A1* | 6/2011 | Cai et al. ......................... | 707/740 |
| 2012/0296845 A1* | 11/2012 | Andrews et al. ............. | 705/36 R |
| 2013/0018896 A1* | 1/2013 | Fleischman et al. .......... | 707/748 |
| 2013/0132851 A1* | 5/2013 | Konopniki et al. ........... | 715/736 |

OTHER PUBLICATIONS

Chenghua Lin and Yulan He. 2009. Joint sentiment/topic model for sentiment analysis. InProceedings of the 18th ACM conference on Information and knowledge management (CIKM '09). ACM, New York, NY, USA, 375-384.*

Erik Boiy and Pieter Hens and Koen Deschacht and Marie-francine Moens. Automatic sentiment analysis in on-line text. In Proceedings of the 11th International Conference on Electronic Publishing (2007}. pp. 349-360.*

Apoorv Agarwal, Boyi Xie, Ilia Vovsha, Owen Rambow, and Rebecca Passonneau. 2011. Sentiment analysis of Twitter data. In Proceedings of the Workshop on Languages in Social Media (LSM '11). Association for Computational Linguistics, Stroudsburg, PA, USA, 30-38.*

Kouloumpis, Efthymios, Theresa Wilson, and Johanna Moore. "Twitter sentiment analysis: The good the bad and the omg!." ICWSM 11 (2011): 538-541.*

(Continued)

Primary Examiner — Jeffrey A Gaffin
Assistant Examiner — David H Kim
(74) Attorney, Agent, or Firm — Mossman Kumar & Tyler PC

(57) ABSTRACT

A computer-implemented method, comprises extracting a measure from a content article representing a probability that the article relates to a topic, allocating the article to a group of articles relating to at least one topic on the basis of the measure, using a set of social media objects relating to the article to extract a measure representing a sentiment for the article, and aggregating respective measures for the sentiment of articles in the group to provide an aggregate measure.

17 Claims, 6 Drawing Sheets

(56) References Cited

OTHER PUBLICATIONS

Pang, Bo, et al., "Thumbs up? Sentiment Classification Using Machine Learning Techniques," Proceedings of the Conference on Empirical Methods in Natural Language Processing, pp. 79-86, Philadelphia, PA, (Jul. 2002).

Blei, David M., et al., "Latent Dirichlet Allocation," Jnl of Machine Learning Research, No. 3, pp. 993-1022 (2003).

Gamon, Michael, et al., "BLEWS: Using Blogs to Provide Context for News Articles," Association for the Advancement of Artificial Intelligence, pp. 60-67 (2008).

Fan, Wen, et al., "Sentiment Classification for Online Comments on Chinese News," 2010 Int'l Conference on Computer Application and System Modeling, V4, pp. 740-745 (2010).

Hui, Peter, et al., "Quantifying Sentiment and Influence in Blogspaces," 1st Workshop on Social Media Analytics, pp. 53-61, Washington, D.C. Jul. 25, 2010.

Marcus, Adam, et al., "TwitInfo: Aggregating and Visualizing Microblogs for Event Exploration," CHI 2011 Session: Twitter Systems, Vancouver, BC, Canada, pp. 227-236, May 7-12, 2011.

Dey, Lipika et al., "Acquiring Competitive Intelligence from Social Media," J-MOCR-AND '11, 9 pp., Beijing, CN (2011).

Amer-Yahia, Sihem, et al., "MAQSA: A System for Social Analytics on News," SIGMOD 12, Scottsdale, AZ, pp. 653-656, May 20-24, 2012.

ISR and Written Opinion in PCT/EP2012/064707, mailed Nov. 21, 2012.

* cited by examiner

SOCIAL ANALYTICS

CROSS REFERENCE TO RELATED APPLICATIONS

This application claims foreign priority from UK Patent Application Serial No. 1202309.9, filed 10 Feb. 2012.

BACKGROUND

The proliferation of social media is changing the way people produce and consume content, such as news for example. Concurrently, as barriers to content production fall and users are given the ability to express their opinions, editors, publishers and content consumers are typically finding it harder to gather and follow current events and trends. In the case of news for example, users can be included at every stage in the process of news making and consumption, both as citizen journalists that disseminate news via traditional and social media, and as commentators that participate in ephemeral networked audiences around particular articles.

For users interested in understanding trends, the notion of topic is of importance, as there will be many different content objects related to a particular event or idea. For example, a topic may be represented as a collection of articles in a single newspaper, as a set of articles in many different papers, as hashtags on social media such as microblogging services, or as a page or set of pages on social media websites.

SUMMARY

According to an example, there is provided a social media analytics platform including a method, system and computer-readable medium which are suitable for providing analytic measurements from social media content which can be linked to a topic.

Typically, content can be in the form of articles on a topic accompanied by social media objects such as comments, blog entries, microblog entries, sentiments and expressions. Articles and social media objects can be unstructured. Accordingly, in an example, unstructured content and objects are aggregated and structure is extracted to enable the execution of topic-centric data retrieval, format and display.

In an example, there is provided a method, system and computer-readable medium to collect and aggregate unstructured qualitative online content in the form of articles relating to a topic and social media objects relevant to the topic and/or article and which are derived from one or more online social media sources. Data relating to the aggregated articles and social media objects can be quantified to generate structured data for an article, topic or user for example.

According to an example, there is provided a computer-implemented method, comprising extracting a measure from a content article representing a probability that the article relates to a topic, allocating the article to a group of articles relating to at least one topic on the basis of the measure, using a set of social media objects relating to the article to extract a measure representing a sentiment for the article, and aggregating respective measures for the sentiment of articles in the group to provide an aggregate measure. A topic signature for the article derived from the probability lies within a predetermined range of a similarity measure for the group. The aggregate measure can represent sentiment for an article, set of articles or topic. Sentiment measures can be aggregated by region or time. The group can be a group of articles or social media objects. A social media object can include a comment, blog post, microblog entry or expression of approval. Extracting a measure can include using a probabilistic generative method to discover a latent topic from the article. Extracting a measure representing sentiment can include using a set of words or phrases which map a respective word or phrase to a sentiment polarity measure to determine a sentiment polarity for a social media object. The set of words or phrases can represent either generic positive and negative sentiment.

According to an example, there is provided a system comprising a topic extraction engine to extract a measure from a content article representing a probability that the article relates to a topic, a sentiment extraction module to extract a measure representing sentiment for the article, an activity frequency module to receive input representing a date and to extract an article from a set of articles that received at least one comment that day. The activity frequency module can aggregate topics from articles in the set and from social media objects relating to the articles in the set. The sentiment extraction module can use a set of words or phrases which map a respective word or phrase to a sentiment polarity measure to determine a sentiment polarity for a social media object related to the article. The activity frequency module can generate data to provide a topic-centric exploration of the content article and related social media objects, including to extract a set of relevant articles, social media objects, entities and locations for the topic.

According to an example, there is provided a computer program embedded on a non-transitory tangible computer readable storage medium, the computer program including machine readable instructions that, when executed by a processor, implement a method comprising extracting a measure from a content article representing a probability that the article relates to a topic, allocating the article to a group relating to at least one topic wherein a topic signature for the article derived from the probability lies within a predetermined range of a similarity measure for the group, using a set of social media objects relating to the article to extract a measure representing a sentiment for the article, and aggregating respective measures for the sentiment of articles in the group to provide an aggregate measure. The method can further include aggregating topics from articles in the group and from social media objects relating to the articles in the group. The method can further include using a set of words or phrases which map a respective word or phrase to a sentiment polarity measure to determine a sentiment polarity for a social media object related to the content article. The method can further include generating data to provide a topic-centric exploration of the content article and related social media objects by extracting a set of relevant articles, social media objects, entities and locations for the topic.

BRIEF DESCRIPTION OF THE DRAWINGS

An embodiment of the invention will now be described, by way of example only, and with reference to the accompanying drawings, in which.

DETAILED DESCRIPTION

It will be understood that, although the terms first, second, etc. may be used herein to describe various elements, these elements should not be limited by these terms. These terms are only used to distinguish one element from another.

The terminology used herein is for the purpose of describing particular examples only and is not intended to be limiting. As used herein, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
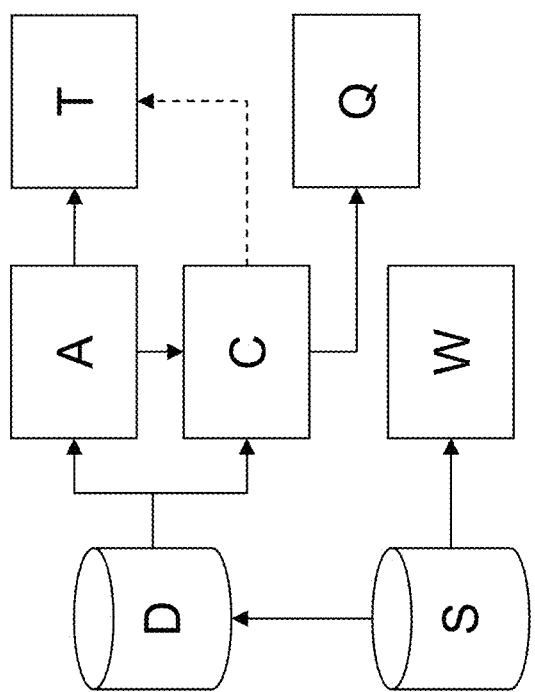
FIG. 1 is a schematic block diagram of a system according to an example.

According to an example, and with reference to FIG. 1 which is a schematic block diagram of a system according to an example, a database D of articles A and a collection of social media objects such as user comments C for each article in the database are provided. Database D can include multiple articles, each of which can have multiple comments associated with it, such as comments from users who have read articles for example. Comments C are social media object which can include a blog or microblog entry, other short textual entries including text in informal language and including characters or elements expressing an emotion for example, and an expression of like or distaste in an article which can be in the form of a vote for example. Database D can be updated with articles and social media objects periodically or in real time.

An article A can include a webpage W from a website S. Alternatively, an article A can be a document or part of a webpage, such as a news article for example. An article A contains subject-matter relating to one or more topics T. A social media object can also relate to a topic T. Typically, a social media object topic will be closely linked to that of the article to which the object pertains, although it will be appreciated that topics may diverge.

According to an example, given a set of articles relevant to a topic, an interactive topic-centric activity dashboard and associated plug-in or add-on that summarizes the actions of a large number of users in a way that appeals both to content editors and publishers, and consumers can be generated. In an example, a plug-in can include multiple configurable components to add functionality to an application such as web browser for example. Certain functionality provided by a plug-in can be customised.

Three dimensions can be exploited in building an aggregation-based summary of articles and comments: time, geographic location, and topic. Time is important for understanding changing topic trends and sentiment evolution. Geographic location can be used to identify trends across news consumers and stories. Finally, related topics bind related articles and comments. A system and method in an example uses time to power an annotated comment timeline. It combines time and geographic location to display aggregate sentiment in user comments. Finally, topics that span articles are used to allow navigation to related articles, entities, tweets, and topics.

In an example, a collection of articles are joined by topic, location, and sentiment Q. Since articles are typically unstructured, a system and method in an example extracts structure from text to allow a join operation. Once articles are joined and aggregated, the aggregates can be used to construct a visualization, for example, or to provide an actionable set of structured data. There are three structure extraction process steps:

1. Topic discovery, in which articles are grouped by topic;
2. Sentiment extraction from article comments, to group articles and comments by user opinion.
3. Article grouping, where related articles, users, and topics are used to provide users with recommendations for additional reading or people to follow via a social network, blog or microblogging service for example.

In an example, an article is a tuple with several fields, including a unique identifier aid, a title, a post_date, an author, and content. Topics are also tuples, containing the topic id tid, and a human-readable description. A comment is a tuple with a comment id cid, a user id uid, article foreign key aid, text fields for subject and message, a post_location and a timestamp. Tables or similar objects can be generated to track the association between articles and topics, and between articles and the locations they mention.

Figure 2:
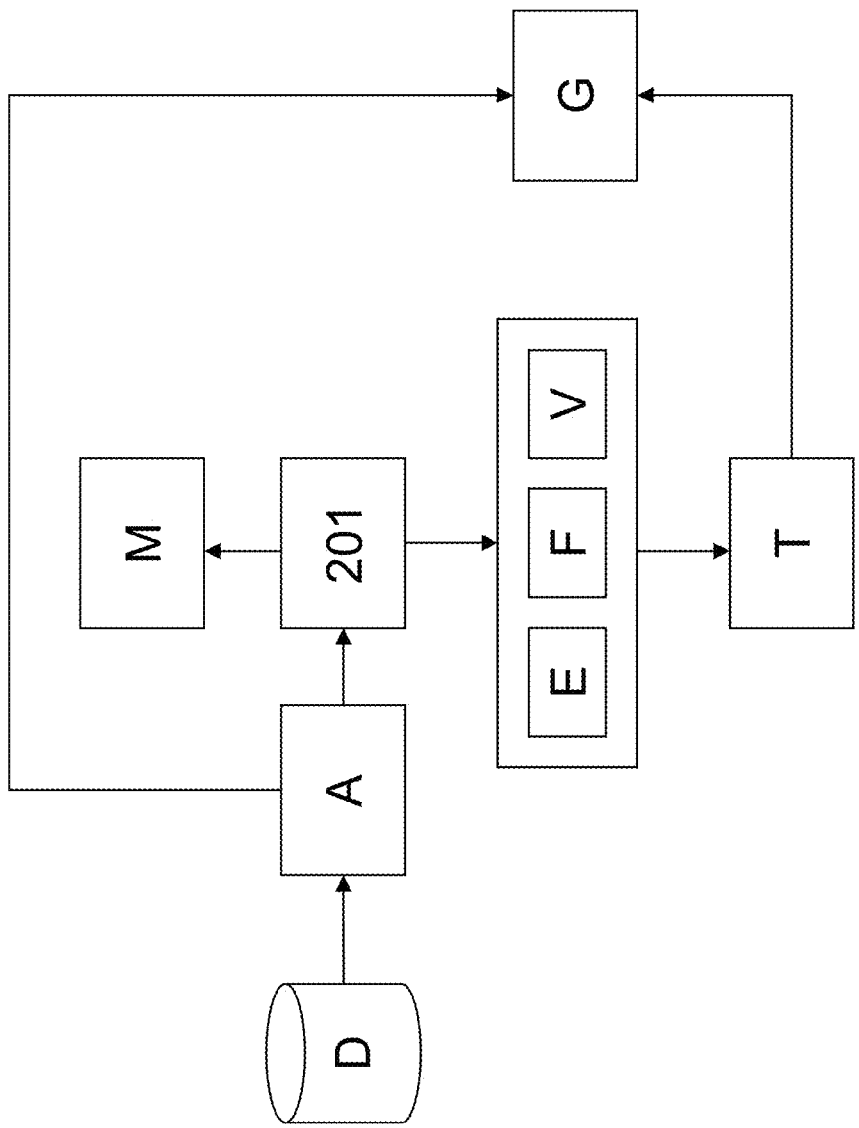
FIG. 2 is a schematic block diagram of a system according to an example.

FIG. 2 is a schematic block diagram of a system according to an example. A Topic Extraction module 201 extracts topics from existing and incoming articles A. In an example, the topic for an article is broadly characterised. For example, semantic metadata for the content from database D can be extracted using known tools which analyse articles in order to determine certain entities within them. In an example, entities, E, such as mentioned people, companies, organisations, geographies, books, authors and so on, facts F such as positions, alliances, political information and so on, and events V are extracted from an article A. Each article A can therefore have associated with it one or more broad pre-defined categories. Where content for an article includes subject-matter relating to a category, a topic score M can be provided which provides a measure representing the degree to which the article relates to a topic.

In an example, articles with a topic score M that indicates that they contain subject-matter which relates to one or more common topics can be grouped together in an article group G under the broad category in question.

Given a grouping of articles G which includes articles which are categorised according to a top level category descriptor, articles in group G can be further categorised. In an example, a probabilistic generative method that uses a Bayesian network to discover a set of latent topics from articles in G can be used. Each article is viewed as a document formed by the words it contains. For example, latent Dirichlet analysis can output the probability of a topic generating each word in an article, as well as the probability of an article being about a topic. In an example, each article is associated with a topic signature $T(a)=(t,score(a,t))$ where $score(a,t)$ is the relevance of an article a to topic t which can be sub topic which is related to the broad category T.

Other techniques to determine a measure for the likelihood of an article being related to a topic can be used. Typically, all involve characterising each article by a set of pairs (t, score(a,t))

Figure 3:
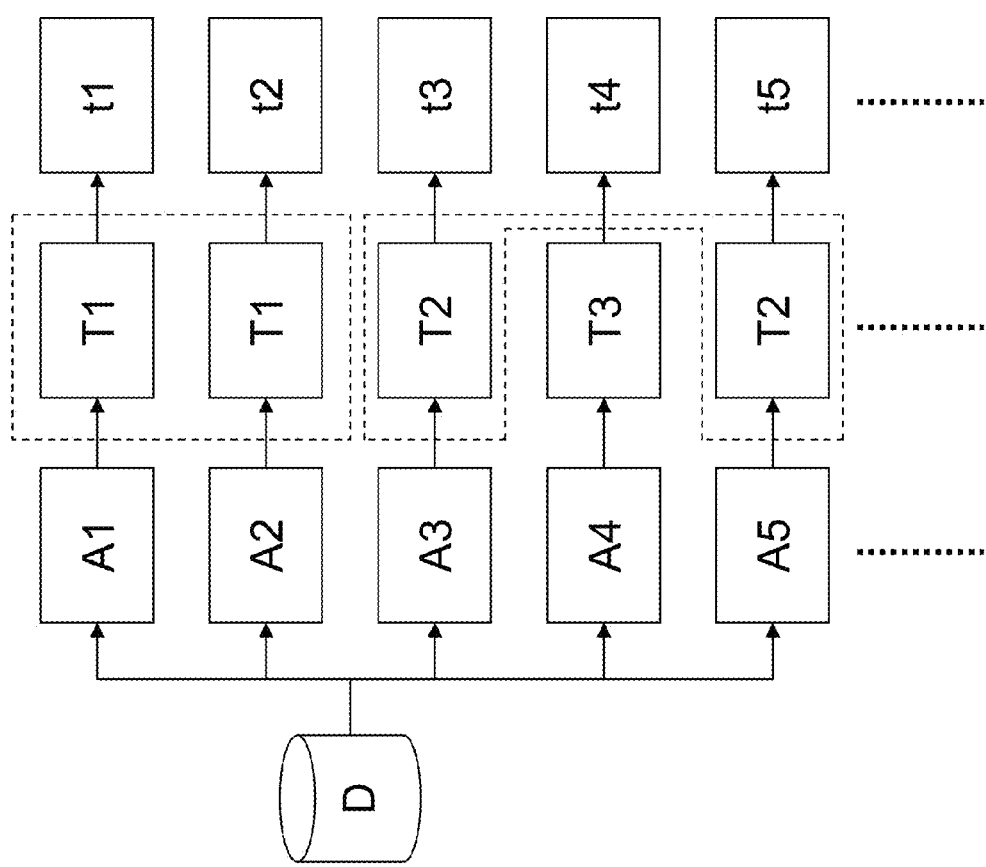
FIG. 3 is a schematic block diagram of a system according to an example.

FIG. 3 is a schematic block diagram of a system according to an example. A set of articles A1-5 are processed in order to determine categories representing first topics T1-3 for the articles. Several articles may be categorised as being about the same broad topic. For example, articles A1 and A2 both relate to topic T1, whilst articles A3 and A5 both relate to topic T2. More specific topics t1-5 are then determined from within the groups of articles forming topics T. In the example of FIG. 3, each article relates to a different sub-topic, even though some of them are grouped within the same higher level topic categories. In an example, multiple articles can relate to the same sub-topic. That is, a group of articles clustered according to topic T can relate to different or linked sub-topics.

An Activity Frequency module 103 implements an interactive topic-centric exploration of content, such as news for example. That is, when a user selects a date, articles that received at least one comment that day are extracted and used to aggregate topics and user comments. A graph or other similar visual object can be generated in which an edge represents a user posting a comment on an article on a particular day. The Activity Frequency module 103 implements topic aggregation from both comments and articles in order to extract the topics of the day, the topics covered by comments that day, related entities, related articles, and related tweets.

A Sentiment Extraction module 105 uses dictionaries containing words and phrases which include a measure for sentiment polarity. Sentiment is first extracted from each comment and aggregated at three levels: article, day, and geographic region. Typically, such dictionaries contain words that express generic positive and negative sentiment.

Users can express sentiment for different article categories using different words however. Accordingly, in an example, topics are learnt using a method in which terms in an initial term dictionary can be refined.

Initially, one dictionary per topic that contains a small number of positive and negative seed words can be used and then the dictionary can be expanded. For example, existing sources including ontologies containing words, concepts and relationships such as synonyms and antonyms can be navigated. Accordingly, a dictionary for each topic can be organically grown. In an example, one dictionary per topic is used for the reason that people will typically express sentiment very differently for different topics. For example, the word beat has a different sentiment according to its use under different contexts. It will be appreciated that more than one dictionary may be used.

In an example, a visualization can be keyed by topic, which is supplied by a user. That is, given a topic t, a set of relevant articles A, their comments, and the entities and locations they reference can be extracted. From those articles, a set of articles S corresponds to a user-selected time range in a comment timeline. These articles represent the current set being displayed in a visualization and can change every time the user selects a different date for example. Articles that are related will have similar topics. Accordingly, clusters of similar articles can be identified. In order to measure similarity, the topic signature of a set or group of articles S is computed, denoted T(S)=(t, score(S,t) where score(S, t) is a measure representing the average score for an article in S.

Figure 4:
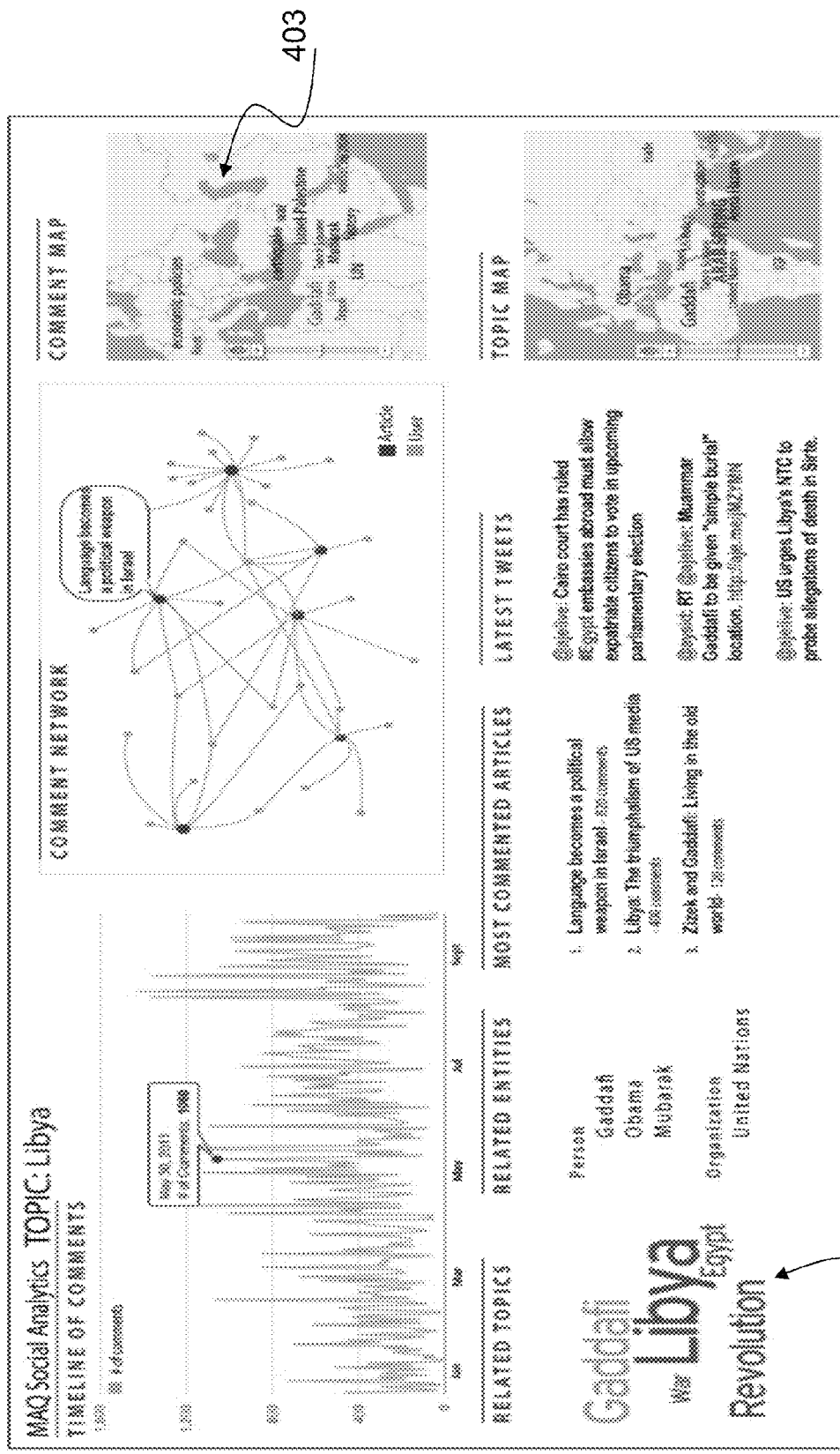
FIG. 4 example of a visualisation according to an example.

Sets of related articles will typically have more concentrated topic score distributions. Similarly, the topic signature of a comment and of a collection of comments can be defined FIG. 4 is an example of a visualisation according to an example. The size of each topic in the word cloud 401 shown in FIG. 4 is determined using its relative score in T(S). In an example, the topic map 401 is generated using a combination of the article location, which can be extracted from an article using any one of various known techniques, and topics in T(S).

Each article can receive comments from users located in different geographic areas. In an example, comments are grouped by geographic region according to the location of users who authored the comments. A topic signature for each set of comments is computed, and each location and topic signature can be displayed on a comment map such as 403 in FIG. 4. In order to extract microblog posts relating to a set of articles S, the top scoring topics in T(S) can be used.

To generate a sentiment dashboard comments can be grouped by location and time window, and the average sentiment in each location or time period computed. In addition to, or in place of, averaging sentiment, any suitable aggregation technique can be utilised. For example, variance and identification of polarized populations can be used as aggregation techniques.

Figure 5:
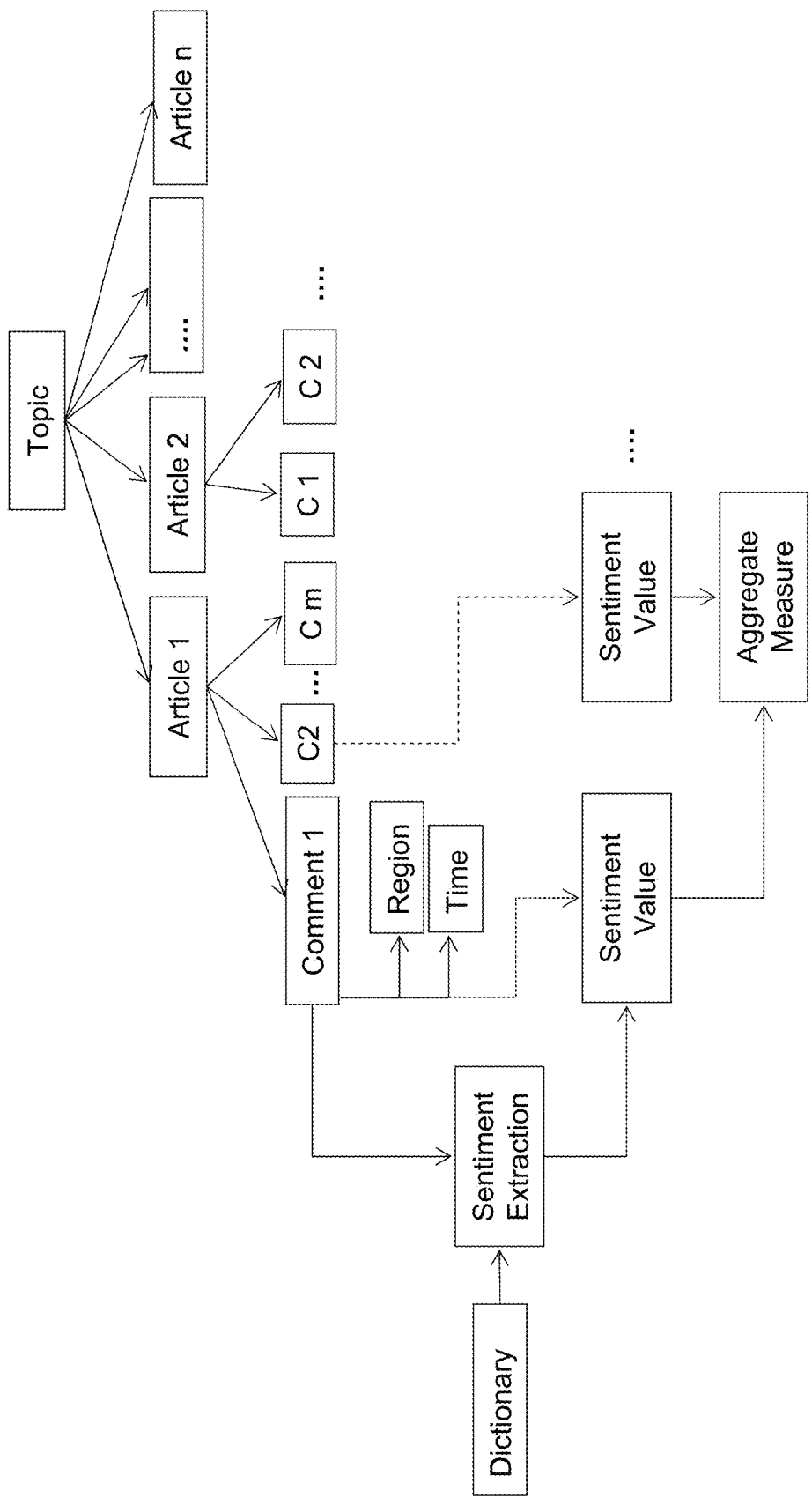
FIG. 5 is a schematic block diagram of a method according to an example.

FIG. 5 is a schematic block diagram of a method according to an example. A topic, which can be a broad topic or sub-topic as described above relates to multiple articles (1 to n). Each article includes a number of comments (1 to m). As described, each comment can be a comment in the normal sense of the word, or alternatively can be a social media object which can include other elements which enables a user to express a sentiment or opinion about a topic or article. Each comment can have an associated region and time—in an example, the associated region is a region in which the user making the comments is making the comment from. The time is the time the comment is made, and can be fine or coarse grained (such as to the second or to the day/month and so on). The sentiment extraction module extracts sentiment from each comment for an article using a dictionary as described above. The module uses the measure for sentiment to provide a sentiment value for the comment.

In an example, extracted sentiment values for comments can be aggregated. That is, the sentiment measure for multiple comments can be aggregated in order to obtain a measure for the sentiment for an article or more broadly a topic. For example, where a sentiment value is a simple numeric value, the average over all articles or topics can be determined to provide an aggregate value. In addition to, or in place of, averaging sentiment values, any suitable aggregation technique can be utilised. For example, variance and identification of polarized populations can be used as aggregation techniques. Aggregates related to a topic can be used to extract a topic-specific article for example. Alternatively, aggregates can be computed by region or time so that it is possible to determine a change in sentiment relating to an article, set of articles or a topic over regions and/or over a desired timeframe.

Figure 6:
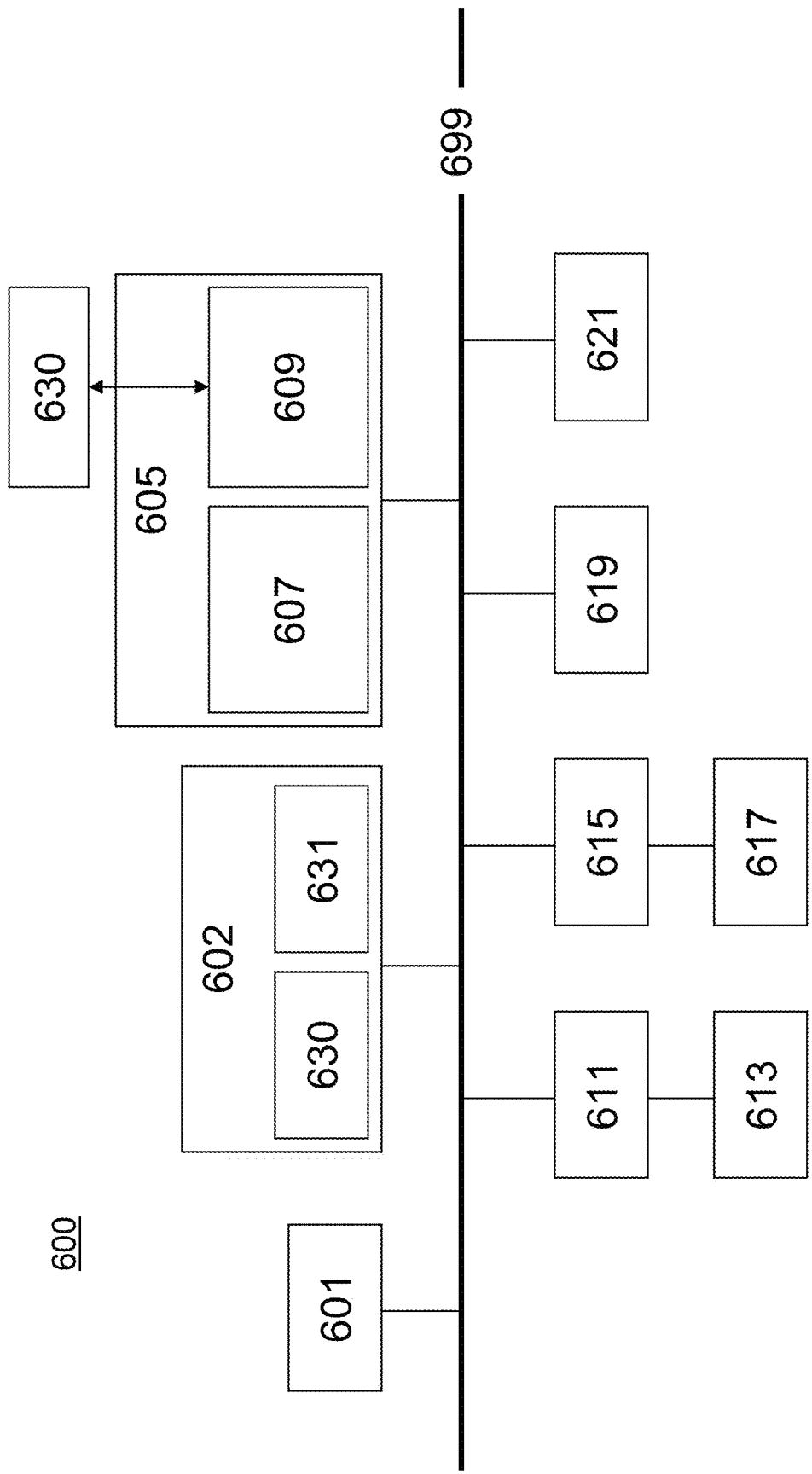
FIG. 6 is a schematic block diagram of a system according to an example.

FIG. 6 is a schematic block diagram of a system according to an example, and which is suitable for implementing any of the systems, methods or processes described above. Apparatus 600 includes one or more processors, such as processor 601, providing an execution platform for executing machine readable instructions such as software. Commands and data from the processor 601 are communicated over a communication bus 699. The system 600 also includes a main memory 602, such as a Random Access Memory (RAM), where machine readable instructions may reside during runtime, and a secondary memory 605. The secondary memory 605 includes, for example, a hard disk drive 607 and/or a removable storage drive 630, representing a floppy diskette drive, a magnetic tape drive, a compact disk drive, etc., or a nonvolatile memory where a copy of the machine readable instructions or software may be stored. The secondary memory 605 may also include ROM (read only memory), EPROM (erasable, programmable ROM), EEPROM (electrically erasable, programmable ROM). In addition to software, data representing any one or more of data fragments of files or private-public key pairs for example may be stored in the main memory 602 and/or the secondary memory 605. The removable storage drive 630 reads from and/or writes to a removable storage unit 609 in a well-known manner.

A user can interface with the system 600 with one or more input devices 611, such as a keyboard, a mouse, a stylus, a touch screen device and the like in order to provide user input data for example. The display adaptor 615 interfaces with the communication bus 699 and the display 617 and receives display data from the processor 601 and converts the display data into display commands for the display 617. A network interface 619 is provided for communicating with other systems and devices via a network. The system can include a wireless interface 621 for communicating with wireless devices in the wireless community.

It will be apparent to one of ordinary skill in the art that one or more of the components of the system 600 may not be included and/or other components may be added as is known in the art. The system 600 shown in FIG. 6 is provided as an example of a possible platform that may be used, and other types of platforms may be used as is known in the art. One or more of the steps described above may be implemented as instructions embedded on a computer readable medium and executed on the system 600. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. The same is true of computer networks in general. It is therefore to be understood that those functions enumerated above may be performed by any electronic device capable of executing the above-described functions. The system of FIG. 6 can be in the form of mobile device such as a smart device in the form of a mobile telephone or tablet computing device for example. It is typical to interface with such devices using a touch enabled interface in which a user can interact with various icons and other graphical elements by touch gestures via a display of the device. In an example, a typical "long press" touch gesture on graphical element representing a folder or file can be used to present a user with an option to include this in their backup. Other alternatives are possible. For example, other suitable gestures can be used to invoke a backup option.

According to an example, a topic extraction engine 630 can reside in memory 602 and operate on data from input sources. Further, a sentiment extraction module 631 and/or an activity frequency module can reside in memory 602.

What is claimed is:

1. A computer-implemented method, comprising:
    extracting a measure from a content article representing a probability that the content article relates to a topic;
    allocating the content article to a group of articles relating to at least one topic on the basis of the measure;
    using a set of social media objects relating to the content article to extract a measure representing a sentiment for the content article, wherein the measure is extracted using a topic specific dictionary; and
    aggregating respective measures for the sentiment of articles in the group to provide an aggregate measure.

2. A computer-implemented method as claimed in claim 1, wherein a topic signature for the content article derived from the probability lies within a predetermined range of a similarity measure for the group.

3. A computer-implemented method as claimed in claim 1, wherein the aggregate measure represents sentiment for an article, set of articles or topic.

4. A computer-implemented method as claimed in claim 1, wherein sentiment measures are aggregated by region or time.

5. A computer-implemented method as claimed in claim 1, wherein the group is a group of articles or social media objects.

6. A computer-implemented method as claimed in claim 1, wherein the group is a group of articles or social media objects, and wherein a social media object includes a comment, blog post, microblog entry or expression of approval.

7. A computer-implemented method as claimed in claim 1, wherein extracting a measure includes using a probabilistic generative method to discover a latent topic from the content article.

8. A computer-implemented method as claimed in claim 1, wherein extracting a measure representing sentiment includes using a set of words or phrases which map a respective word or phrase to a sentiment polarity measure to determine a sentiment polarity for a social media object.

9. A computer-implemented method as claimed in claim 1, wherein extracting a measure representing sentiment includes using a set of words or phrases which map a respective word or phrase to a sentiment polarity measure to determine a sentiment polarity for a social media object, and wherein the set of words or phrases represent either generic positive and negative sentiment.

10. A system comprising:
    at least one processor configured to implement instructions, comprising:
        a topic extraction engine to extract a measure from a content article representing a probability that the content article relates to a topic;
        a sentiment extraction module using a topic specific dictionary to extract a measure representing sentiment for the content article;
        an activity frequency module to receive input representing a date and to extract an article from a set of articles that received at least one comment that day.

11. A system as claimed in claim 10, the activity frequency module further to aggregate topics from articles in the set and from social media objects relating to the articles in the set.

12. A system as claimed in claim 10, the sentiment extraction module to use a set of words or phrases which map a respective word or phrase to a sentiment polarity measure to determine a sentiment polarity for a social media object related to the content article.

13. A system as claimed in claim 10, the activity frequency module to generate data to provide a topic-centric exploration of the content article and related social media objects, including to extract a set of relevant articles, social media objects, entities and locations for the topic.

14. A computer program embedded on a non-transitory tangible computer readable storage medium, the computer program including machine readable instructions that, when executed by a processor, implement a method comprising:

extracting a measure from a content article representing a probability that the content article relates to a topic;

allocating the content article to a group relating to at least one topic wherein a topic signature for the content article derived from the probability lies within a predetermined range of a similarity measure for the group;

using a set of social media objects relating to the content article to extract a measure representing a sentiment for content the article, wherein the measure is extracted using a topic specific dictionary; and aggregating respective measures for the sentiment of articles in the group to provide an aggregate measure.

15. A computer program embedded on a non-transitory tangible computer readable storage medium as claimed in claim 14, the computer program including machine readable instructions that, when executed by a processor, implement a method, further including aggregating topics from articles in the group and from social media objects relating to the articles in the group.

16. A computer program embedded on a non-transitory tangible computer readable storage medium as claimed in claim 14, the computer program including machine readable instructions that, when executed by a processor, implement a method, further including using a set of words or phrases which map a respective word or phrase to a sentiment polarity measure to determine a sentiment polarity for a social media object related to the content article.

17. A computer program embedded on a non-transitory tangible computer readable storage medium as claimed in claim 14, the computer program including machine readable instructions that, when executed by a processor, implement a method, further including generating data to provide a topic-centric exploration of the content article and related social media objects by extracting a set of relevant articles, social media objects, entities and locations for the topic.

* * * * *